UNITED STATES PATENT OFFICE.

CHARLES TOPPAN, OF WAKEFIELD, MASSACHUSETTS.

IMPROVEMENT IN THE MANUFACTURE OF OILS FROM PETROLEUM.

Specification forming part of Letters Patent No. 99,500, dated February 1, 1870.

*To all whom it may concern:*

Be it known that I, CHARLES TOPPAN, of Wakefield, in the county of Middlesex and State of Massachusetts, have invented an Improvement in the Manufacture of Oil and other Products of Petroleum; and I hereby declare the following to be a full, clear, and exact description thereof.

The heavy oils which are produced from petroleum, and which are known in commerce as paraffine-oils, and used for currying and lubricating, are found to answer a good purpose, but, owing to their dark color, cannot be used upon harness, belt, trunk, lace, or other light-colored leather. Moreover, the common paraffine-oil is of a lighter specific gravity than fish-oil; consequently leather, when stuffed with paraffine-oil, will weigh less than when fish-oil is employed. Furthermore, a white deposit is sometimes formed upon the surface of leather stuffed with paraffine-oil, which injures its appearance and sale.

These objections are obviated by my invention, which consists in filtering the paraffine-oils now in common use, and which are produced by distillation in a "vacuum-still," so called, whereby certain light-colored, inodorous products, of heavy specific gravities, are obtained, which may be used with great advantage in currying light or dark-colored leather, and also for lubricating, and for various other purposes.

To enable others skilled in the art to understand and use my invention, I will proceed to describe the manner in which I have carried it out.

I take the article known in commerce as "vacuum-oil," that is, any heavy paraffine-oil produced from a vacuum-still.

Many kinds of vacuum-stills are in common use, and many have been patented. Among other patents for this purpose, I refer to No. 34,324, granted to H. W. C. Tweddle, on the 4th day of February, A. D. 1862; No. 56,852, granted to M. P. Ewing, assignor to H. B. Everest, on the 31st day of July, A. D. 1866; and No. 58,020, granted to M. P. Ewing, assignor to H. B. Everest and George P. Ewing, on the 11th day of September, A. D. 1866. Many other patents have been granted on the same subject, and I refer to these only as a means of distinctly specifying the oil which I use.

My invention is not limited to the treatment of oil produced by any particular apparatus or mode of treatment, but extends to the treatment of any heavy paraffine-oil possessing the same qualities as the oil produced by the processes above referred to.

This oil is taken at a temperature sufficiently high to make it run freely, (above blood-heat,) and is filtered through charcoal, bone-dust, or other material ordinarily used as a filtering-medium.

The first product obtained—about four (4) per cent. of the whole—which I denominate "amorphous paraffine," is inodorous, thick, white, and translucent, and, as it will not crystallize, is particularly useful in the manufacture of dressing for the hair, soap, and other toilet-articles.

The specific gravity of the amorphous paraffine is from 24° to 36°, indicated by the Baumé hydrometer.

The first product having been removed, the filtering is continued, and a second product (about forty-three per cent. of the whole) is obtained. This product, which is of a light straw-color, and of a specific gravity of about 20° Baumé, is especially adapted as a "stuffing," to be used in currying leather of various descriptions. The specific gravity of this product is much greater than the ordinary dark-colored heavy paraffine-oil commonly used, and will consequently cause the leather to weigh as much as where fish-oil is employed, and the white deposit on the surface of the leather, incident to the use of the dark-colored heavy paraffine-oil, is entirely avoided.

The second product having been removed, the filtering is continued, and a third product (also about forty-three per cent. of the whole) is obtained, which is of an amber color, also of a specific gravity of about 20° Baumé. This third product (which is the last obtained) is also well adapted as a stuffing for leather, and both the second and third products may be used for lubricating and other purposes.

After obtaining the three products above named, about ten (10) per cent. of the quantity originally introduced into the filter will remain therein, which cannot be utilized.

Instead of separating the filtrate into three products, as above described, it is evident that it may be separated at different stages into a greater or lesser number of products, to suit the requirements of the case, and, if desired, two or more of these products may be afterward mixed or combined together.

In practice there will usually be no need of separating the second and third products, but they may both be collected together.

What I claim as my invention, and desire to secure by Letters Patent, is—

1. The within-described process of treating heavy paraffine-oil, as and for the purpose set forth.

2. As a new article of manufacture, the products resulting from the filtration of heavy paraffine-oil, substantially as set forth.

CHARLES TOPPAN.

Witnesses:
P. E. TESCHEMACHER,
W. J. CAMBRIDGE.